United States Patent [19]

Nguyen

[11] Patent Number: 4,987,795
[45] Date of Patent: Jan. 29, 1991

[54] VENTED TRANSMISSION

[75] Inventor: Tuan H. Nguyen, San Diego, Calif.

[73] Assignee: Sundstrand Corporation, Rockford, Ill.

[21] Appl. No.: 431,398

[22] Filed: Nov. 3, 1989

[51] Int. Cl.$^5$ ............................................. F16H 57/02
[52] U.S. Cl. .................................. 74/606 R; 464/170; 55/409
[58] Field of Search .................... 74/606 R; 55/409; 464/170

[56] References Cited

U.S. PATENT DOCUMENTS

| | | | |
|---|---|---|---|
| 1,144,331 | 6/1915 | Lower | |
| 1,529,936 | 3/1925 | Tinniswood | 74/606 R |
| 2,818,047 | 12/1957 | Powell | 74/606 R X |
| 3,378,104 | 4/1968 | Venalde | 55/409 X |
| 4,409,401 | 9/1977 | Smith | 55/409 X |
| 4,446,755 | 5/1984 | Takahashi | 74/606 R |
| 4,554,844 | 11/1985 | Hamano | 74/606 R |
| 4,595,118 | 6/1986 | Azuma et al. | 74/606 R X |
| 4,911,035 | 3/1990 | Taguchi | 74/606 R |

FOREIGN PATENT DOCUMENTS

| | | | |
|---|---|---|---|
| 595293 | 3/1960 | Canada | 55/409 |
| 94169 | 6/1982 | Japan | 74/606 R |
| 8703818 | 7/1987 | PCT Int'l Appl. | 55/409 |

Primary Examiner—Rodney H. Bonck
Assistant Examiner—Khoi Q. Ta
Attorney, Agent, or Firm—Wood, Phillips, Mason, Recktenwald & VanSanten

[57] ABSTRACT

The difficulty of venting oil from a transmission with the venting of gas therefrom is avoided in a vented transmission construction including a housing (10), a rotary input (12) to the housing (10), a rotary output (46) from the housing (10), and a transmission (24, 26, 28, 30, 32, 44, 48) interconnecting the input (12) and the output (46) and including a hollow rotary shaft (34) journaled within the housing (10). A vent tube (64) has one end (66) extending into one end (54) of the hollow shaft (34) and another end (68) in fluid communication with the exterior of the housing (10). A shoulder (56) within the hollow shaft defines a relatively small diameter section (58) and a relatively large diameter section (60) and at least one aperture (62) extends through the hollow shaft (34) from the larger diameter section (60) immediately adjacent the shoulder (56). A labyrinth seal (72) is located at the interface of the vent tube (64) and the larger diameter section (60) at a location between the aperture (62) and the end (68) of the vent tube (64). The construction provides for centrifugal separation of gas to be vented and lubricant within the housing (10).

9 Claims, 1 Drawing Sheet

VENTED TRANSMISSION

FIELD OF THE INVENTION

This invention relates to a vented transmission, and more specifically, to one that may be operating under positive pressure with respect to the ambient pressure, or otherwise require venting without loss of lubricant.

BACKGROUND OF THE INVENTION

As is well known, mechanical transmissions quite typically include housings containing rotating shafts, gears and other rotating components. Provision is made for lubricating bearings, the interfaces of meshing gears, or the like with lubricating oil. Frequently, the rotational speed of the parts receiving the oil is such that the oil is broken down into fine droplets to generate a mist within the transmission.

Such oil must be retained within the transmission if lubrication costs are to be minimized and damage to the transmission for lack of lubricant avoided. Further, discharge into the surrounding environment will generally be undesirable.

At the same time, it is desirable that transmissions be vented so that pressures do not build up within the same as the transmission heats up from ambient after it has been put in operation as such pressure could drive lubricant out of the housing through seals or the like, resulting in a loss of lubricant and ultimate failure of the transmission due to seizure of parts. In the normal case, such venting does not pose a particular problem since basically all that is involved is disposing a vent at a location isolated, usually by baffles, from the area in which lubricant may be entrained in the atmosphere within the transmission. In essence, the transmission merely "breathes" through such a vent with very little gas exiting or entering the vent.

There are, however, instances where the transmission will be operating under a positive internal pressure in relation to the ambient. One such example is transmissions utilized in power units such as auxiliary power units or emergency power units employed in aircraft. Not infrequently a gas turbine will be utilized to drive hydraulic pumps and/or electrical generators via a transmission. While the power takeoff from the turbine to the transmission can be taken from the turbine wheel side of the gas turbine engine, because that environment is relatively more hostile due to hot exhaust gases and the like, it is more common that the power takeoff be taken from the compressor side of the gas turbine engine. As a consequence of this in many gas turbine designs, there exists a leakage path from the output side of the compressor through the engine rotor and ultimately to the transmission to which it is connected. As a consequence, compressed air from the compressor of the engine will be continually leaking into the transmission during operation and such gas must be vented from the transmission continually without discharging lubricant so as to prevent the buildup of pressure within the transmission.

The present invention is directed to solving the above problem.

SUMMARY OF THE INVENTION

It is the principal object of the invention to provide a new and improved vented transmission. More specifically, it is an object of the invention to provide a vented transmission that is particularly suited to continually receive pressurized gas at a pressure in excess of the ambient during its operation.

An exemplary embodiment of the invention achieves the foregoing object in a vented transmission including a housing, a rotary input to the housing, a rotary output from the housing, and transmission means within the housing interconnecting the input and the output and including a hollow, rotary shaft journaled within the housing. A shoulder is disposed within the hollow shaft intermediate the ends thereof and thus defines a relatively smaller diameter section and a relatively larger diameter section. At least one aperture extends through the hollowshaft from the larger diameter section and a labyrinth seal is located at the larger diameter section at a location axially spaced from the aperture. A vent is in fluid communication with the interior of the shaft.

As a consequence of this construction, gas under pressure within the transmission housing, with or without entrained oil, may enter the hollow shaft through the aperture. Any oil entering with the gas and/or leaking past the labyrinth seal centrifuges out by reason of its density being greater than that of the gas and may be returned to the interior of the transmission by centrifugal force causing flow through the aperture.

In a preferred embodiment, the aperture opens to both the larger diameter and the smaller diameter sections, that is, on each side of the shoulder.

The invention also contemplates that the vent be in the form of a vent tube having one end extending into one end of the hollow shaft and another end in fluid communication with the exterior of the housing. The shoulder is then disposed intermediate the ends of the vent tube such that the relatively smaller diameter section is near the end of the vent tube that is within the hollow shaft and the relatively larger diameter section is near the other end of the vent tube. In a highly preferred embodiment, the tube is made of a material that is softer than the shaft and the labyrinth seal is integral with the vent tube.

Preferably, the aperture is at an acute angle to the axis of the shaft. In a highly preferred embodiment, the aperture angles toward the end of the vent tube within the hollow shaft as one moves in the radially inward direction.

The invention also contemplates that there be plural ones of the said apertures.

Other objects and advantages will become apparent from the following specification taken in connection with the accompanying drawings.

DESCRIPTION OF THE PREFERRED EMBODIMENT

Figure 1:
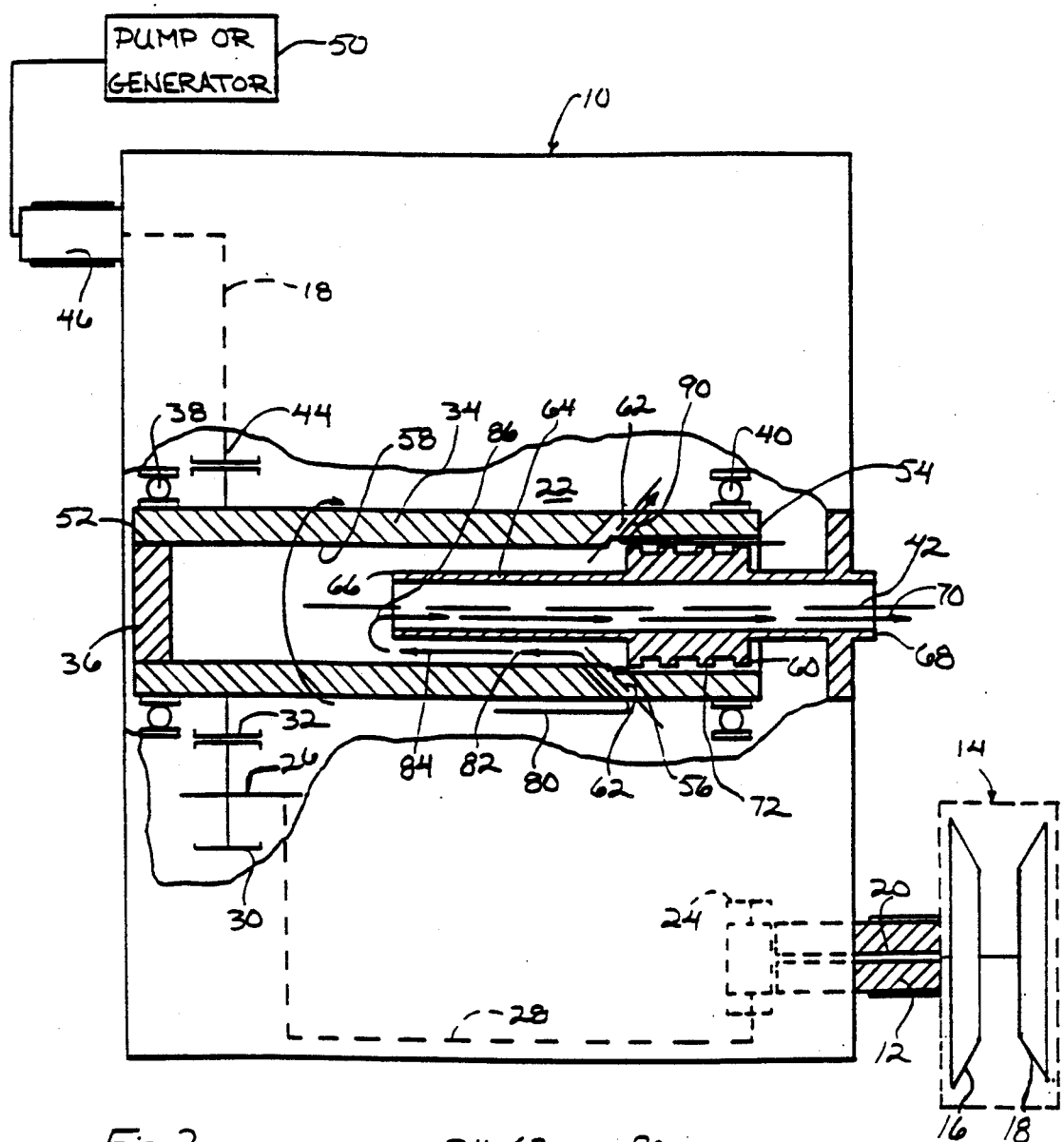
FIG. 1 is a somewhat schematic illustration of a vented transmission made according to the invention.

A vented transmission made according to the invention is illustrated in the drawings and will be described in the environment of a transmission intended to interconnect a gas turbine engine and a pump and/or generating system. However, it is to be understood that the invention may be advantageously employed in any vented transmission wherein there is a need to separate lubricant from gas within the transmission housing prior to discharge of the gas from the housing.

Referring to FIG. 1, the transmission of the invention includes a housing, schematically and generally illustrated at 10. A rotary input shaft 12 is suitably journaled within the housing 10 and extends therefrom to a gas turbine engine 14. It will be observed that the shaft 12 connects to the compressor 16 of the engine 14 as opposed to the turbine wheel section 18 which is on the opposite side of the compressor 16. In any event, such a connection establishes a leakage path 20 for compressed air from the compressor 16 to the interior 22 of the housing 10 via the input shaft 12.

The input shaft 12, within the housing 10, may mount a gear schematically illustrated at 24 which in turn is mechanically linked to, for example, a rotary shaft 26 within the interior 22 of the housing 10 by shafts, gears or the like, collectively and schematically illustrated at 28. The shaft 26 mounts a spur gear 30 which in turn drives a gear 32 coupled to a hollow shaft 34. The hollow shaft 34 is plugged at one end as by a plug 36 and is journaled by bearings 38 and 40 for rotation within the housing 10 about an axis 42.

The gear 32 may also engage one or more gears 44 which are coupled to a rotary output shaft 46 journaled within the housing 10. The coupling to the shaft 46 is schematically illustrated at 48. The output shaft 46 in turn may be coupled to a pump and/or a generator shown schematically in the block 50.

According to the invention, the hollow shaft 34, on its interior, and intermediate its ends 52 and 54, includes a shoulder 56. The shoulder 56 thus divides the interior of the hollow shaft 34 into a relatively smaller diameter section 58 extending to the end 52 and a relatively larger diameter section 60 extending to the end 54. A plurality of apertures 62 extend from the interior of the hollow shaft 34 and specifically, at least from the relatively large diameter section 60. In the preferred embodiment illustrated, the apertures 62 join to both the larger diameter section 60 and the smaller diameter section 58, opening on both sides of the shoulder 56 as perhaps best seen in FIG. 2. It will also be observed that the apertures 62 are at an acute angle to the axis 42 and angle toward the shaft end 52 as one moves in the radially inward direction.

A vent tube 64 extends into the end 54 of the hollow shaft 34 and terminates in an end 66 within the smaller diameter section 58 in axially spaced relation to the apertures 62. The end 68 of the vent tube 64 opposite the end 66 extends through the housing 10 to vent the interior 22 of the housing 10 to the exterior thereof as illustrated by an arrow 70.

Intermediate the ends 66 and 68, the vent tube 64 has an integral labyrinth seal configuration 72 which is brought into close proximity to the large diameter section 60 as is well known. The spacing illustrated in FIG. 1 is, of course, exaggerated. It will be observed that the labyrinth seal configuration 72 is located between the apertures 62 and the end 54 and is for the purpose of minimizing the passage of lubricating oil from the interior 22 of the housing 10 into the interior of the hollow shaft 34 through the end 54 without making a contacting seal.

In a preferred embodiment, the vent tube 64 and integral labyrinth seal configuration 72 are made of a material that is softer than that of which the hollow shaft 34 is formed such that if contact between the two is made, particularly in the vicinity of the labyrinth seal 72 where clearances will be close, the contacting part of the vent tube 64 or labyrinth seal configuration 72 will simply rub away without damaging the transmission.

In operation, gas leaking into the interior 22 of the transmission in the housing 10 will flow the direction of arrows 80 radially inwardly along the aperture 62 to an annulus 82 that is defined by the spacing between the smaller diameter section 58 and the exterior of the vent tube 64. At this location, the air passes in the direction of an arrow 84 until it reaches the end 66 of the vent tube 64. At this point, the air reverses direction as illustrated by an arrow 86 and flows through the interior of the vent tube 64 to emerge as vented gas as illustrated by the arrow 70.

Should this air stream contain any entrained oil, as it enters the hollow shaft 34, which will be rotating during operation of the transmission, the air stream will be accelerated into rotation as well and the resulting centrifugal force will cause the oil droplets to centrifuge out against the interior of the hollow shaft 34 because of the fact that they will have a greater density than the flowing gas. From the inner surface of the hollow shaft 34, the oil is free to move, under centrifugal force, radially outwardly through the apertures 62 as indicated by an arrow 90.

Generally speaking, however, the quantity of oil causing the greatest concern is that which leaks past the labyrinth seal configuration as illustrated by arrows 92. This oil will come, of course, upon the large diameter section 60 and upon encountering the shoulder 56 will not be permitted to move inwardly because of the centrifugal force acting upon it. However, because the shoulder 56 is located in alignment with the aperture 62, such oil will be free to flow radially outwardly in the direction of the arrows 90 as a result of centrifugal force.

Figure 2:
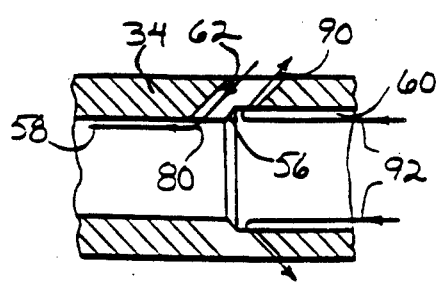
FIG. 2 is a fragmentary sectional view of part of the transmission with certain components omitted for clarity.

By locating the apertures 62 so that they open to both sides of the shoulder 56, as viewed in FIG. 2, compressed gas may enter along the left-hand side of each aperture 62 as shown by arrow 80 while the oil may exit the right-hand side of the aperture 62 as illustrated by the arrows 90. The angling of the apertures 62 aids in directing the less dense component, the compressed air, in the general direction of the end 66 of the vent tube 64.

From the foregoing, it will be appreciated that a vented transmission made according to the invention provides for positive separation of oil and leakage gas prior to the venting of the latter to ensure that oil starvation within the transmission cannot occur as the result of inadvertently venting oil with the gas or as a result of pressure induced leakage of oil caused by the leaking gas.

I claim:

1. A vented transmission comprising:
   a housing;
   a rotary input to said housing;
   a rotary output from said housing;
   transmission means within said housing interconnecting said input and said output and including a hollow, rotary shaft journaled within said housing;
   a vent tube having a first end extending into one end of said hollow shaft and a second end in fluid communication with the exterior of said housing;
   a shoulder within said hollow shaft and intermediate the ends of said vent tube and defining a relatively smaller diameter section near said first end of said vent tube that is within said hollow shaft and a relatively larger diameter section nearer said second end of said vent tube;

at least one aperture extending through said hollow shaft from said larger diameter section immediately adjacent said shoulder; and a labyrinth seal at the interface of said vent tube and said larger diameter section at a location between said aperture(s) and said second end of said vent tube.

2. The vented transmission of claim 1 wherein said tube is made of a material that is softer than said shaft and said labyrinth seal is integral with said tube.

3. The vented transmission of claim 1 wherein said aperture (s) is non-transverse to the axis of said shaft and angles toward said first end of said vent tube in the radially inward direction.

4. The vented transmission of claim 1 wherein said aperture opens to both said sections on both sides of said shoulder.

5. A vented transmission comprising:

a housing;

a rotary input to said housing;

a rotary output from said housing;

transmission means within said housing interconnecting said input and said output and including a hollow, rotary shaft journaled within said housing;

a shoulder within said hollow shaft intermediate the ends thereof and defining a relatively smaller diameter section and a relatively larger diameter section;

at least one aperture extending through said hollow shaft from said larger diameter section;

a labyrinth seal at said larger diameter section at a location axially spaced from said aperture(s); and a vent in fluid communication with the interior of said shaft.

6. The vented transmission of claim 5 wherein said aperture(s) opens to both said sections on each side of said shoulder.

7. A vented transmission comprising:

a housing;

a rotary input to said housing;

a rotary output from said housing;

transmission means within said housing interconnecting said input and said output and including a hollow, rotary shaft journaled within said housing;

a vent tube extending into said hollow shaft and in fluid communication with the exterior of said housing;

a shoulder within said hollow shaft and intermediate the ends thereof;

at least one aperture extending through said hollow shaft at said shoulder; and a labyrinth seal at the interface of said vent tube and said hollow shaft at a location spaced from said aperture(s).

8. The vented transmission of claim 7 wherein there are plural said apertures, each extending through said hollow shaft at an acute angle to said axis.

9. The vented transmission of claim 7 wherein said vent tube has an end in said hollow shaft substantially spaced from said shoulder.

* * * * *